Patented Aug. 14, 1945

2,381,885

UNITED STATES PATENT OFFICE 2,381,885

MIXED ESTERS

John C. Sauer, Wilmington, Del., assignor to E. I. du Pont de Nemours & Company, Wilmington, Del., a corporation of Delaware No Drawing. Application April 30, 1942,
Serial No. 441,221

11 Claims. (Cl. 260—410.8)

The invention relates to new synthetic drying oils and to coating compositions containing them.

The higher grade natural drying oils, such as China wood, perilla, and oiticica oils, are for the most part imported and are subject to wide fluctuation in price, quality, and availability. Some of these oils also have a tendency to form films which "crystallize" or "frost." Previous attempts to provide synthetic substitutes having the desirable film-forming properties of these natural oils have been for the most part unsatisfactory in one or more ways.

This invention accordingly has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

An additional objective is the provision of methods of making these new esters.

Another objective is the preparation of new and improved coating compositions.

The above and other objects appearing hereinafter are accomplished by preparing, for example, by one of the methods subsequently described in detail, a polyhydric alcohol mixed ester of an α,β-ethylenic-α-(alken-1-yl) monofunctional monocarboxylic acid and at least one other monofunctional monocarboxylic acid of different structure, preferably unsaturated acids and in particular those derived from natural drying or semi-drying oils. The products are thus polyhydric alcohol mixed esters, the acyl radicals of which comprise those of the α,β-ethylenic-α-(alken-1-yl) monofunctional monocarboxylic acid and of the different monofunctional monocarboxylic acid or acids.

As will be evident from the terminology used, the acid first mentioned above is a special type of polyunsaturated branched chain acid having an ethylenic double bond between the α and β carbons, and, attached to the α carbon, an aliphatic side chain having an ethylenic double bond in the position nearest to the main chain.

This structure will be readily understood from an inspection of the formula for α-vinylcinnamic, i. e., α-ethenylcinnamic, acid,

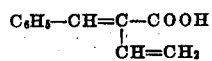

which is a typical α,β-ethylenic-α-(alken-1-yl) monofunctional monocarboxylic acid. The novel properties of the products are considered to depend from this peculiar arrangement of the double bonds in relation to each other and to the carboxyl group. The remainder of the molecule is substantially immaterial provided the acid is "monofunctional" (i. e., contains no group, such as hydroxyl, amino, sulfhydryl, or the like, which is known to react with the carboxyl group under normal esterification conditions), though for best results the molecule as a whole should contain no more than one terminal methylene ($=CH_2$) group.

The mixed esters of this invention can be prepared in general by reacting a polyhydric alcohol simultaneously or successively, in either order, with one or more of the above described α,β-ethylenic-α-(alken-1-yl) monofunctional monocarboxylic acids, or their esterifiable derivatives, and with at least one monofunctional monocarboxylic acid of different structure, or appropriate esterifiable derivative.

More specifically, in one of the preferred methods of carrying out the invention, an α,β-ethylenic-α-(alken-1-yl) monofunctional monocarboxylic acid is reacted with a polyhydric alcohol which has been partially esterified with a different acid or acids. When these polyhydric alcohol partial esters are glycerol partial esters of a long chain fatty acid, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed, along with a small amount of alcoholysis catalyst (e. g., 0.01 to 0.1% litharge based on the oil), in a reactor fitted with an agitator, a device to measure the temperature, and a gas inlet. The mixture is then heated with stirring for one to two hours at about 200-225° C., and oxygen-free inert gas such as carbon dioxide or nitrogen being passed into and over the mixture. In the esterification step, this polyhydric alcohol partial ester is usually cooled to about 140–150° C., and the α,β-ethylenic-α-(alken-1-yl) monofunctional monocarboxylic acid is introduced in approximately the amount sufficient to esterify the free hydroxyl groups calculated to be present from the initial proportions of oil and polyhydric alcohol. A hydrocarbon solvent, such as xylene or toluene, is next added in an amount sufficient to produce boiling when the temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction is completed within about 4–16 hours; thus, when the temperature is around 200° C., the process is usually complete within 8–12 hours. The reaction can be accelerated if desired by means of esterification catalysts. The progress of the reaction can be followed by acid number determinations, the heating being stopped when the acid number reaches or approaches constancy, or the desired value. There is obtained a viscous solution of the new drying oil from which the solvent can be removed, if desired, by distillation or blowing with carbon dioxide. The resulting oil, or its solution as obtained in the process, can be formulated, by conventional methods used with natural drying oils, into valuable coating compositions. For such purposes, it can be used alone, or in blends with natural or synthetic resins and/or natural drying or semi-drying oils. Hot blending of these new oils with the natural drying or semi-drying oils gives coating composition vehicles of unique properties.

Another good method of preparing the polyhydric alcohol mixed esters of this invention is to heat together a polyhydric alcohol, a polyhydric alcohol ester such as a drying or semi-drying oil, and sufficient α,β-ethylenic-α-(alken-1-yl) monofunctional monocarboxylic acid to esterify the free hydroxyl groups present in this mixture.

In preparing the esters of the present invention, certain precautions are often necessary in order to obtain satisfactory results from a number of standpoints. The esterification reaction for the preparation of the drying oil is preferably carried out at as low a temperature as is practical. Another such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reduction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelatin of the resulting compositions.

The more detailed practice of the invention is illustrated in the following examples wherein the amounts of the ingredients are by weight, such examples being given by way of illustration and not as a limitation. Viscosities and colors are given on the Gardner-Holdt scale. Where cobalt drier is mentioned, sufficient of a 2% cobalt naphthenate solution has been used to give the indicated content of cobalt metal, this proportion being based on oil. The ester composition in the title of Example 1 is an index to the proportion of monocarboxylic acid radicals in the product.

EXAMPLE 1

*Glycerol mixed ester of linseed oil acids and α-vinylcinnamic acid*

|  | Percent |
|---|---|
| α-Vinylcinnamic acid glyceride | 24.2 |
| Linseed acids glyceride | 75.8 |

A partial glycerol ester of linseed oil acids, commonly called linseed oil diglyceride, is first prepared by agitating 1300 parts of alkali-refined linseed oil with 69.4 parts of refined glycerol in an inert atmosphere at 250° C. for 1.5 hours. To 74 parts of this diglyceride is added 21 parts of α-vinylcinnamic acid (prepared by condensing benzaldehyde with crotonic anhydride in the presence of triethylamine according to the method of Kuhn and Ishikawa Ber. 64, 2347 (1931)) and 10 parts of toluene, and the mixture is refluxed for 8 hours at 206–220° C. in an apparatus designed to allow the condensation of toluene and water of esterification, separation of the water, and return of toluene to the reaction vessel. The resulting mixed glyceride is then heated for 1 hour at 150° C. under a pressure of 20 mm. to remove the toluene, after which it is cooled and filtered. This mixed ester is an oil having the following physical and analytical values: $N_D^{25}$ 1.5073; $d_4^{25}$ 0.9946; hydroxyl No. 21.9 (corrected for acidity); iodine No. 126.7; acid No. 9.2; viscosity W; color 4.8. With 0.03% cobalt, this oil dries to hard, light-colored, tack-free films upon standing for a period of 8 hours at room temperature. Unmodified linseed oil under the same drying conditions is tacky after the same period of time and finally dries to a soft weak film having residual tack.

EXAMPLE 2

*Varnish*

Eighteen (18) parts of the oil of Example 1 is heated at 280–290° C. for 0.5 hour in a carbon dioxide atmosphere, during which time the oil is bodied to a viscosity of Z–4. To this product is added 5.2 parts of rosin-extended phenol-formaldehyde resin ("Amberol") and 0.1 part of lime, and the mixture stirred vigorously until a clear, homogeneous solution results. This solution is then cooled to 160° C., diluted with an equal weight of a hydrocarbon solvent, and 1.8 parts of a lead drier and 0.45 part of a manganese drier added, after which the solution is cooled and filtered. Films of this composition are clear, light-colored, hard, and thoroughly tack-free after overnight drying at room temperature.

EXAMPLE 3

*Enamel*

A mixture of 33 parts of the oil of Example 1, 16 parts of titanium oxide pigment, 16 parts of antimony oxide pigment, and 40 parts of mineral spirits are tumbled in a ball mill for about 100 hours. To the resulting blend is added sufficient cobalt drier to give a composition of about 0.03% cobalt. Films of the enamel thus obtained are tack-free after overnight drying, and are hard, adherent, and glossy.

For each particular combination of polyhydric alcohol, $\alpha,\beta$-ethylenic-$\alpha$-(alken-1-yl) monofunctional monocarboxylic acid, and other monocarboxylic acid, there is a range of $\alpha,\beta$-ethylenic-$\alpha$-(alken-1-yl) monofunctional monocarboxylic acid-polyhydric alcohol ester content, within which the products dry fastest and have best film properties generally. In regard to the glycerol mixed esters of $\alpha,\beta$-ethylenic-$\alpha$-(alken-1-yl) monofunctional monocarboxylic acid, and more particularly in regard to glycerol mixed esters of $\alpha$-vinylcinnamic acid and drying or semi-drying oil acids (especially linseed oil acids), it will usually be found that the most valuable products have on the order of 5–35% of $\alpha,\beta$-ethylenic-$\alpha$-(alken-1-yl) monofunctional monocarboxylic acid glyceride. The proportions for best results will, however, vary somewhat with the particular ingredients.

After the film-forming properties of esters obtained from different proportions of a particular polyhydric alcohol, $\alpha,\beta$-ethylenic-$\alpha$-(alken-1-yl) monofunctional monocarboxylic acid, and other monocarboxylic acid have been established by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the $\alpha,\beta$-ethylenic-$\alpha$-(alken-1-yl) monofunctional monocarboxylic acid. More specifically, when the polyhydric alcohol is glycerol and the other acid is drying or semi-drying oil acids, it is possible, by appropriate selection of proportions, to prepare a mixed glyceride having the desired degree of improvement (up to the maximum possible for the ingredients involved) as compared to the drying or semi-drying oil whose acids are being used.

The desired proportion of $\alpha,\beta$-ethylenic-$\alpha$-(alken-1-yl) monofunctional monocarboxylic acid glyceride is normally obtained by using the calculated amount of such acid or esterifiable derivative. However, an effect which approaches or equals the behavior of the mixed ester so made can be obtained by preparing a mixed ester in which the $\alpha,\beta$-ethylenic-$\alpha$-(alken-1-yl) acid glyceride content is higher than that desired, and blending it with the drying oil whose acids are being used (or a different oil if desired) in an amount which is calculated to give a mixed ester of the desired $\alpha,\beta$-ethylenic-$\alpha$-(alken-1-yl) monofunctional monocarboxylic acid glyceride content. If the $\alpha,\beta$-ethylenic-$\alpha$-(alken-1-yl) acid glyceride content is high, e. g., above about 25%, the blending is preferably carried out at elevated temperatures; suitable conditions are, for example, the heating of the two oils, with stirring and in an inert gas atmosphere, for about 0.5 hour at about 200° C. Under these conditions, it is probable that some interchange occurs, since the film-forming properties are usually better than those of cold-blends of the two oils.

As has already been indicated, the esters of the present invention can be made by reacting the polyhydric alcohol simultaneously or successively, in any order, with the $\alpha,\beta$-ethylenic-$\alpha$-(alken-1-yl) monofunctional monocarboxylic acid or acids and other monocarboxylic acid or acids. Or a polyhydric alcohol simple ester of either the $\alpha,\beta$-ethylenic-$\alpha$-(alken-1-yl) monofunctional monocarboxylic acid or the other acid can be reacted successively with additional polyhydric alcohol and the remaining acid. In the first, i. e., alcoholysis, step of this latter process, an ester interchange catalyst, such as litharge, sodium hydroxide, sodium alcoholate, etc., is preferably included in small amount suitably from 0.01% to 1.0%. The reaction temperature for the alcoholysis can be varied from 150° C. to 300° C., depending on the extent of alcoholysis desired, the nature and amount of catalyst, if any, and the susceptibility of the ester to gelling.

Also, as has been stated, esterifiable derivatives of both the $\alpha,\beta$-ethylenic-$\alpha$-(alken-1-yl) monofunctional monocarboxylic acid and the different acids can be used in the above processes in place of the free acid. Suitable derivatives are the anhydride, an acid halide, or an ester with an alcohol more volatile than the polyhydric alcohol whose ester is to be prepared.

The reaction temperature can be varied widely, but will in general be governed by the reactants used; thus with an acid halide or anhydride, temperatures in the neighborhood of 20–100° C. are usually sufficient to produce esterification, while the direct esterifications with acids and the ester-interchange processes are preferably operated at temperatures above 100° C. and below 275° C.

Solvents and other preparative details should be adjusted to the method chosen, the manner of so doing being apparent to one skilled in the art. When the solution method heretofore discussed is to be used, any inert water-immiscible liquid which dissolves the product is suitable, hydrocarbons being preferable, and the amount can be varied as desired. Suitable specific solvents include toluene, xylene, cymene, amylbenzene, tetrachloroethane, anisol, and cyclohexanone. Aromatic hydrocarbons, chlorinated solvents, ethers, and ketones are suitable in general. A boiling point in the range 100–200° C. is desirable. The process of the invention can also be carried out in the absence of a solvent.

In addition to glycerol and pentaerythritol, other polyhydric alcohols can be used in the present invention, such as ethylene glycol, diethylene glycol, triethylene glycol, hexamethylene glycol, decamethylene glycol, erythritol, sorbitol, cyclohexyl-1,2-dicarbinol, and p,p'-di(2-hydroxyethyl)benzene.

The monofunctional monocarboxylic acid or acids other than the $\alpha,\beta$-ethylenic-$\alpha$-(alken-1-yl) acid can be any monofunctional monocarboxylic acid, or any mixture of such acids. Specific additional acids that are suitable include perilla oil acids, oiticica oil acids, China wood oil acids, corn oil acids, cottonseed oil acids, coconut oil acids, oleic acid, stearic acid, lauric acid, p-toluic acid, crotonic acid, furoic acid, sorbic acid, quinolinic acid, $\alpha$-naphthionic acid, phenoxyacetic acid, and the like. These acids may be aromatic or aliphatic; open or closed chain and, if the latter, monocyclic, polycyclic, homocyclic, or heterocyclic; saturated or unsaturated; straight or branched chain; and substituted or not by other groups or atoms, such as ether, ketone, or halogen, which do not interfere with the desired esterification reaction.

Any $\alpha,\beta$-ethylenic-$\alpha$-(alken-1-yl) monofunction monocarboxylic acid, as hereinbefore explained, can be employed, though such acid preferably should have, at most, only one terminal methylene group, since acids having a plurality of such groups are most unstable, susceptible to oxidation, and difficult to handle in that they form gelled products more readily. The $\alpha,\beta$-ethylenic-$\alpha$-(alken-1-yl) monofunctional monocarboxylic acid may or may not contain substituent radicals of any kind which do not interfere with the esterification reaction. Such radicals may be aromatic or aliphatic; open or closed chain and, if the latter, homocyclic or heterocyclic; saturated or unsaturated; and substituted or not by such inert groups as ether, ketone, halogen, or sulfide. The following specific $\alpha,\beta$-ethylenic-$\alpha$-(alken-1-yl) acids can be used instead of the $\alpha$-vinylcinnamic acid of Example 1 with similar results: 2-benzylidene-3-methylbutene-3-oic acid, 2-isopropenyl-5-phenyl-pentadien-2,4-oic acid; 2-benzylidene-heptadien-3,5-oic acid, and $\alpha$-vinylcrotonic acid.

In addition to the particular coating compositions of the examples, the present esters can be formulated into any other desired type of paint, varnish, lacquer, or enamel. Thus, they can be blended by conventional methods with other varnish gums, such as copal, kauri, ester gum, oil-soluble phenol-formaldehyde resins, and rosin-extended phenol-formaldehyde resins such as "Amberols"; with other resins, such as vinyl or urea-formaldehyde types; and cellulose derivatives, such as nitrocellulose, cellulose acetate, cellulose aceto-propionate, and ethyl cellulose; with auxiliary components of all kinds, such as waxes, solvents, pigments, plasticizers, etc., as needed and desired; and to particular advantage with fatty oils, especially drying or semi-drying oils, as is explained above.

These compositions can be applied to many kinds of surfaces and materials, e. g., metal, wood, paper, linen, silk, cotton, other textiles, regenerated cellulose wrapping foil, etc. Specific manufactures that can be so produced are linoleum, patent leather, linoxyn-type materials, coated copper wire, oiled cloth, oiled silk, and sandpaper. The products of the invention can also be made up into molding compositions, putties, and the like. In addition, they can be employed as modifying agents for urea-formaldehyde and phenolformaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as for example, the remarkable ability to form films which do not crystallize, wrinkle, or frost, as do films from the more rapidly drying natural oils, such as China wood oil. Furthermore, it is possible to take any fatty oil, including one that has a low order of drying, and, by substituting a part of the fatty acid making up that oil by an $\alpha,\beta$-ethylenic-$\alpha$-(alken-1-yl) monofunctional monocarboxylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol mixed ester of an $\alpha,\beta$-ethylenic-$\alpha$-(alken-1-yl) monofunctional monocarboxylic acid and another monofunctional monocarboxylic acid.

2. A glycerol mixed ester of an $\alpha,\beta$-ethylenic-$\alpha$-(alken-1-yl) monofunctional monocarboxylic acid and another monofunctional monocarboxylic acid.

3. A glycerol mixed ester of an $\alpha,\beta$-ethylenic-$\alpha$-(alken-1-yl) monofunctional monocarboxylic acid and the acids of a natural fatty oil.

4. A glycerol mixed ester of an $\alpha,\beta$-ethylenic-$\alpha$-(alken-1-yl) monofunctional monocarboxylic acid and the acids of a natural drying oil.

5. A glycerol mixed ester of an $\alpha,\beta$-ethylenic-$\alpha$-(alken-1-yl) monofunctional monocarboxylic acid and linseed oil acids.

6. A polyhydric alcohol mixed ester of $\alpha$-vinylcinnamic acid and another monofunctional monocarboxylic acid.

7. A glycerol mixed ester of $\alpha$-vinylcinnamic acid and another monofunctional monocarboxylic acid.

8. A glycerol mixed ester of $\alpha$-vinylcinnamic acid and the acids of a natural fatty oil.

9. A glycerol mixed ester of $\alpha$-vinylcinnamic acid and the acids of a natural drying oil.

10. A glycerol mixed ester of $\alpha$-vinylcinnamic acid and linseed oil acids.

11. A polyhydric alcohol mixed ester, the acyl radicals of which comprise those of an $\alpha,\beta$-ethylenic-$\alpha$-(alken-1-yl) monofunctional monocarboxylic acid and of a monofunctional monocarboxylic acid of different structure.

JOHN C. SAUER.

CERTIFICATE OF CORRECTION.

Patent No. 2,381,885. August 14, 1945.

JOHN C. SAUER.

It is hereby certified that error appears in the printed specification of the above numbered patent requiring correction as follows: Page 1, first column, line 1, for the words "The invention" read --This invention--; page 2, first column, line 65, for "reduction" read --reaction--; page 4, first column, line 2, for "most" read --more--; line 29, for "and" read --with--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.